US012458971B2

(12) United States Patent
Shi et al.

(10) Patent No.: US 12,458,971 B2
(45) Date of Patent: Nov. 4, 2025

(54) FROZEN SAMPLE HOLDER HAVING IDENTIFICATION RING

(71) Applicants: Yu Shi, Shanghai (CN); Wei Ding, Hangzhou (CN)

(72) Inventors: Yu Shi, Shanghai (CN); Wei Ding, Hangzhou (CN)

(73) Assignees: Yu Shi, Shanghai (CN); Wei Ding, Hangzhou (CN)

( * ) Notice: Subject to any disclaimer, the term of this patent is extended or adjusted under 35 U.S.C. 154(b) by 0 days.

(21) Appl. No.: 17/641,696

(22) PCT Filed: Dec. 29, 2021

(86) PCT No.: PCT/CN2021/142616
§ 371 (c)(1),
(2) Date: Mar. 9, 2022

(87) PCT Pub. No.: WO2023/092807
PCT Pub. Date: Jun. 1, 2023

(65) Prior Publication Data

US 2023/0415159 A1 Dec. 28, 2023

(30) Foreign Application Priority Data

Nov. 25, 2021 (CN) ......................... 202111411326.X

(51) Int. Cl.
*B01L 3/00* (2006.01)
*A01N 1/00* (2006.01)
*B01L 9/00* (2006.01)

(52) U.S. Cl.
CPC ................ *B01L 3/545* (2013.01); *B01L 9/50* (2013.01); *B01L 2300/021* (2013.01); *B01L 2300/0803* (2013.01)

(58) Field of Classification Search
CPC .................... G01N 35/00732; B01L 2300/021
See application file for complete search history.

(56) References Cited

U.S. PATENT DOCUMENTS 4,164,320 A * 8/1979 Irazoqui .................. G09F 3/005 235/382
2002/0069649 A1 6/2002 Buia et al.
(Continued)

FOREIGN PATENT DOCUMENTS

CN 208151352 U 11/2018
CN 112284842 A * 1/2021
(Continued)

OTHER PUBLICATIONS

English language translation of CN 113340643, generated 2025.*
(Continued)

*Primary Examiner* — Nathan A Bowers
(74) *Attorney, Agent, or Firm* — Fresh IP PLC; Clifford D. Hyra; Aubrey Y. Chen

(57) ABSTRACT

The present disclosure provides a frozen sample holder having an identification ring, and relates to the technical field of freezing sectioning-related equipment, the frozen sample holder having an identification ring comprising an identification ring structure and a frozen sample holder structure, wherein the identification ring structure is in connection with an outer wall of the frozen sample holder structure; and the identification ring structure includes an identification segment, which is configured to mark the information of a sample in the frozen sample holder structure. The present disclosure solves the technical problem existing in the operating process of freezing sectioning all along that multiple samples would easily be confused with each other due to the difficulty to mark frozen sample holders.

10 Claims, 3 Drawing Sheets

(56) References Cited

U.S. PATENT DOCUMENTS

| | | | | |
|---|---|---|---|---|
| 2007/0077655 | A1* | 4/2007 | Unger ................ | G06Q 30/0641 435/253.6 |
| 2013/0078669 | A1 | 3/2013 | Heid et al. | |
| 2015/0205986 | A1 | 7/2015 | Morris et al. | |
| 2021/0025793 | A1 | 1/2021 | Nedunuri | |
| 2021/0262906 | A1 | 8/2021 | Hewitt et al. | |
| 2022/0034761 | A1* | 2/2022 | Iqbal ..................... | B01L 3/5023 |

FOREIGN PATENT DOCUMENTS

| | | | | |
|---|---|---|---|---|
| CN | 213644189 | U | | 7/2021 |
| CN | 113340643 | A | * | 9/2021 |
| CN | 214844325 | U | | 11/2021 |
| CN | 212871935 | U | | 4/2023 |
| JP | 2006300745 | A | | 8/2011 |
| WO | 2021067940 | A1 | | 4/2021 |

OTHER PUBLICATIONS

English language translation of CN 112284842, generated 2025.*
International Search report of the Searching Authority of PCT/CN2021/142616 mailing date of Jul. 27, 2022.
International Written Opinion of the Searching Authority of PCT/CN2021/142616 mailing date of Jul. 27, 2022.
Office Action of foreign application CN202111411326X mailing date of Jul. 26, 2022.
EP Office Action 21863091.1-1001 mailing date of Jul. 19, 2023.

* cited by examiner

FROZEN SAMPLE HOLDER HAVING IDENTIFICATION RING

CROSS-REFERENCE TO RELATED APPLICATIONS

The present disclosure claims the priority to the Chinese patent application filed with the Chinese Patent Office on Nov. 25, 2021 with the filing No. 202111411326.X, and entitled "Frozen Sample Holder Having Identification Ring", all the contents of which are incorporated herein by reference.

TECHNICAL FIELD

The present disclosure relates to the technical field of frozen section-related equipment, and particularly to a frozen sample holder having an identification ring.

BACKGROUND

Freezing sectioning is the most widely applied method of conventional histological slide preparation techniques. Frozen sections are not only used to observe the morphological structure of normal cell tissues, but also represent a main method adopted, clinically and in scientific research, in disciplines, such as pathology and forensic science, for studying, observing, and judging the morphological changes of cell tissues, and have also been widely applied in the research of many other fields of discipline.

During the process of freezing sectioning pathological tissues, it has always been a difficulty to mark frozen sample holders in a freezing microtome; although the marker can be realized by printing and pasting using papers, the papers would easily undergo accidents such as falling off after freezing, being cut by a knife or the like, which results in confused samples, causing medical malpractice.

SUMMARY

The present disclosure provides a frozen sample holder having an identification ring, so as to at least solve the technical problem existing in related technologies that multiple samples would easily be confused with each other due to the difficulty to mark frozen sample holders.

The present disclosure provides a frozen sample holder having an identification ring, which may comprise an identification ring structure and a frozen sample holder structure, wherein the identification ring structure is in connection with an outer wall of the frozen sample holder structure.

The identification ring structure includes an identification segment, which is configured to mark the information of a sample in the frozen sample holder structure.

In an optional embodiment of the present disclosure, the identification ring structure may include an identification ring body and an identification plate, wherein the identification ring body and the identification plate are in connection with each other.

The identification ring body is provided with an accommodating space, and the frozen sample holder structure may be at least partially accommodated in the accommodating space and be in connection with the identification ring body.

The identification segment may be provided on a face of the identification plate at the same side relative to the face where the frozen sample holder structure is placed.

Optionally, the identification ring body and the identification plate are formed integrally, the identification ring body may be in an annular structure, and an area enclosed by an inner ring wall of the identification ring body may be configured as the accommodating space, which may be a cylindrical space, and the frozen sample holder structure may be arranged in the accommodating space and be fixed relative to the identification ring body; and the identification plate may be in connection with an outer side wall of the identification ring body, the identification segment provided on the upper surface of the identification plate may be configured to mark the QR code and the pathological number of a sample in the frozen sample holder structure.

Optionally, the identification ring structure may further include a fixture block, which may be in connection with the identification ring body and be located in the accommodating space.

The frozen sample holder structure may include a frozen sample holder body and a clamping groove.

The clamping groove may be arranged along the circumferential direction of the frozen sample holder body, and the fixture block may be snapped in the clamping groove so as to connect the frozen sample holder body with the identification ring body.

Optionally, the fixture block may be arranged on the inner ring wall of the identification ring body, and the fixture block may be snapped in the clamping groove on an edge of the frozen sample holder body so as to support the frozen sample holder body in a vertical direction; and the outer edge of the frozen sample holder body abuts against the inner edge of the identification ring body.

Optionally, the identification ring structure may further include a protrusion, the protrusion may be arranged along the circumferential direction of the inner ring wall of the identification ring body, the protrusion may abut against the top surface of the frozen sample holder body, and the protrusion is located above the fixture block.

Optionally, the protrusion may be arranged along the circumferential direction of the top of the inner ring wall of the identification ring body, thereby forming an annular limiting baffle plate, and when the identification ring body is sleeved over the frozen sample holder body, the top surface of the frozen sample holder body abuts against the bottom surface of the protrusion; and a surrounding structure is formed at the edge of the top surface of the frozen sample holder body between the protrusion and the identification ring body.

In an optional embodiment of the present disclosure, at least one fixture block may be provided, and when a plurality of the fixture blocks are provided, the plurality of fixture blocks are distributed at an equal interval along the circumferential direction of the accommodating space.

In an optional embodiment of the present disclosure, the frozen sample holder body may include a groove body and a boss, and the groove body and the boss may be arranged coaxially.

A plurality of the groove bodies and a plurality of the bosses may be provided, and the plurality of groove bodies and the plurality of bosses may be alternately arranged from outside to inside in a surrounding manner.

Optionally, the boss may be in an annular structure, and adjacent bosses are arranged at an equal spacing distance, the groove body may be arranged between adjacent bosses, and the groove body may be annular.

Optionally, the bottom surface of the groove body may be inclined in a direction towards the center from the edge of the frozen sample holder body.

In an optional embodiment of the present disclosure, the bottom of the frozen sample holder body may protrude from the lower end of the identification ring body.

In an optional embodiment of the present disclosure, the face of the identification ring body away from the face where the frozen sample holder structure is placed may have rounded inner and outer edges.

Optionally, inner and outer side edges of the lower end of the identification ring body may be formed at a certain radian, such that the frozen sample holder body may not be in contact with the lower end of the identification ring body and a certain gap is retained.

In an optional embodiment of the present disclosure, the upper surface of the identification plate may be inclined downwards in a direction towards the side away from the face wherein the frozen sample holder structure is placed.

The embodiments of the present disclosure can realize at least following beneficial effects.

The present disclosure provides a frozen sample holder having an identification ring, comprising an identification ring structure and a frozen sample holder structure, wherein the identification ring structure is in connection with an outer wall of the frozen sample holder structure; and the identification ring structure includes an identification segment, which is configured to mark the information of a sample in the frozen sample holder structure.

In the present disclosure, by sleeving the identification ring structure over the frozen sample holder structure and marking specific information of samples on the identification ring structure, marking different samples is realized and the technical problem that samples would easily be confused with each other due to the difficulty to mark the frozen sample holder is effectively avoided, without hindering normal use of the frozen sample holder.

In summary, the present disclosure solves the technical problem existing in the related technologies that multiple samples would easily be confused with each other due to the difficulty to mark frozen sample holders.

BRIEF DESCRIPTION OF DRAWINGS

In order to more clearly describe the technical solutions of the specific embodiments of the present disclosure or in the related technologies, the drawings required to be used in the description of the specific embodiments or the related technologies will be simply presented below. Clearly, the drawings described below show certain embodiments of the present disclosure, and for a person ordinarily skilled in the art, further drawings could be obtained according to these drawings without inventive efforts.

Figure 1:
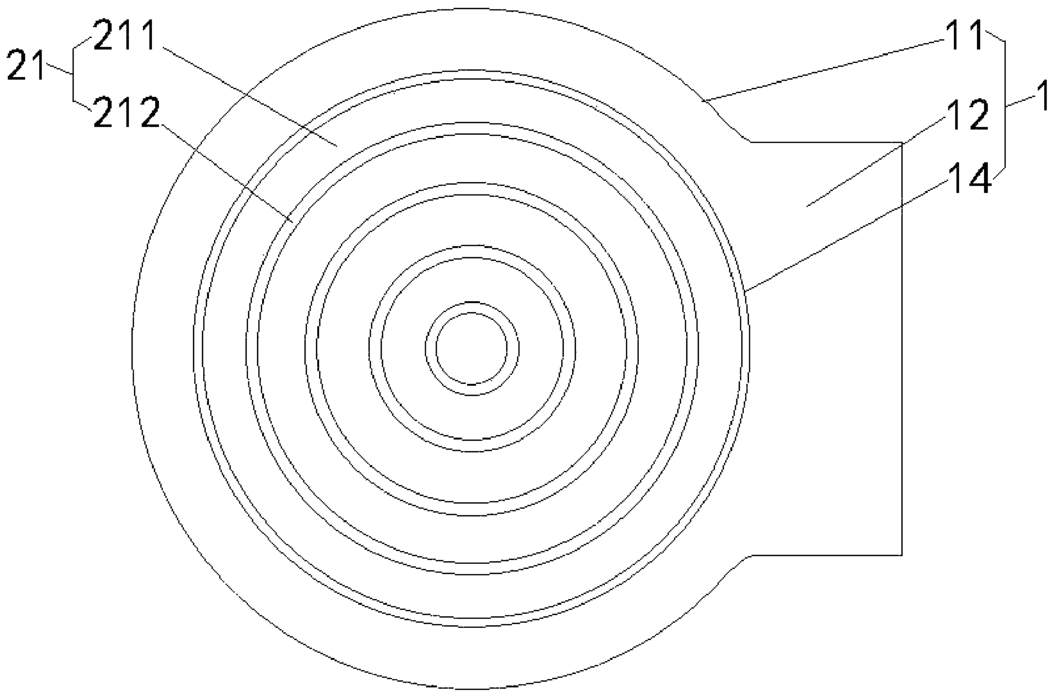
FIG. 1 is a structural schematic diagram showing a frozen sample holder having an identification ring provided in a first embodiment of the present disclosure in a top view.

Reference signs: 1—identification ring structure; 11—identification ring body; 12—identification plate; 13—fixture block; 14—protrusion; 2—frozen sample holder structure; 21—frozen sample holder body; 211—groove body; 212—boss; and 22—clamping groove.

DETAILED DESCRIPTION OF EMBODIMENTS

In order to make the objects, the technical solutions, and the advantages of the embodiments of the present disclosure clearer, the technical solutions in the embodiments of the present disclosure will be clearly and comprehensively described below with reference to the accompanying drawings in the embodiments of the present disclosure. Clearly, the described embodiments are merely some of the embodiments of the present disclosure, but not all the embodiments. Generally, assemblies of the embodiments of the present disclosure, which are described and shown here in the drawings, could be arranged and designed in various different configurations.

Thus, following detailed description of the embodiments of the present disclosure that are provided in the drawings merely represents selected embodiments of the present disclosure, rather than being intended to limit the scope of the present disclosure claimed. All other embodiments, which could be obtained by a person ordinarily skilled in the art on the basis of the embodiments in the present disclosure without inventive efforts, shall fall within the scope of protection of the present disclosure.

It shall be noted that similar reference signs and letters represent similar items in the following drawings, thus, once a certain item is defined in one figure, no further definition and explanation of this item is necessary in subsequent figures.

In the description of the present disclosure, it shall be clarified that orientation or position relationships indicated by terms such as "upper", "lower", "vertical", "horizontal", "inner", and "outer" are orientation or position relationships shown based on the drawings, or orientation or position relationships in which the product of this disclosure is conventionally placed during use, merely for the purpose of facilitating the description of the present disclosure and for simplifying the description, rather than indicating or implying that a specified device or element must be in a specific orientation, and be constructed and operated in a specific orientation, and therefore cannot be construed as limiting the present disclosure. In addition, terms such as "first", "second", and "third" are used merely for purpose of differentiated description, and cannot be construed as indicating or implying to have importance in relativity.

In addition, terms such as "horizontal" and "vertical" do not mean that the components are required to be absolutely horizontal or pendulous, on the contrary, they may be slightly inclined. For example, the term "horizontal" only means that the direction thereof is more horizontal relative to "vertical", rather than indicating that this structure must be completely horizontal, on the contrary, this structure may be slightly inclined.

In the description of the present disclosure, it shall be further clarified that, unless otherwise expressly specified and defined, terms such as "provide", "mount", and "connect" shall be construed in a broad sense. For example, it may be fixed connection, or detachable connection, or integrated connection; it may be mechanical connection, or electrical connection; and it may be direct connection, or indirect connection via an intermediate media, or inner communication between two elements. For a person ordinarily skilled in the art, the specific meanings of the above-mentioned terms in the present disclosure could be construed in accordance with specific circumstances.

Hereinafter, some embodiments of the present disclosure will be described in detail with reference to the accompanying drawings. The following embodiments and the features in the embodiments may be combined with each other without conflicts.

Figure 3:
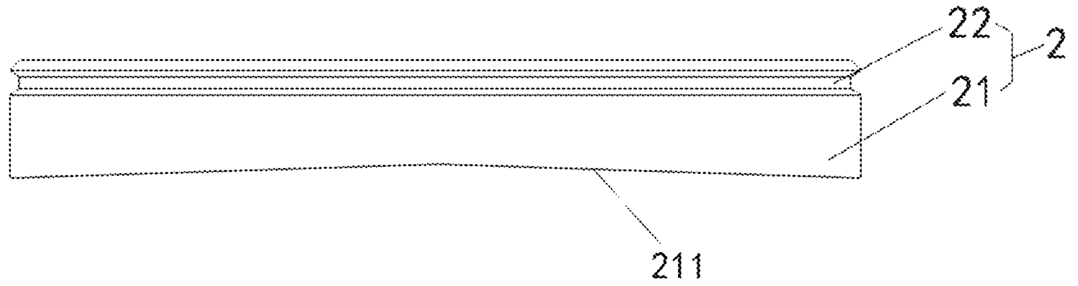
FIG. 3 is a structural schematic diagram showing the frozen sample holder structure of the frozen sample holder having an identification ring shown in FIG. 1 in a side view.

Some embodiments of the present disclosure provide a frozen sample holder having an identification ring, and referring to FIG. 1 and FIG. 3, this frozen sample holder having an identification ring comprises an identification ring structure 1 and a frozen sample holder structure 2, and the identification ring structure 1 is in connection with an outer wall of the frozen sample holder structure 2; and the identification ring structure 1 includes an identification segment, which is configured to mark the information of a sample in the frozen sample holder structure 2.

The frozen sample holder having an identification ring provided in the embodiments of the present disclosure at least solves the technical problem existing in the related technologies that multiple samples would easily be confused with each other due to the difficulty to mark frozen sample holders.

Some embodiments of the present disclosure provide a frozen sample holder having an identification ring, comprising an identification ring structure 1 and a frozen sample holder structure 2, wherein the identification ring structure 1 is in connection with an outer wall of the frozen sample holder structure 2; and the identification ring structure 1 includes an identification segment, which is configured to mark the information of a sample in the frozen sample holder structure 2.

In some embodiments of the present disclosure, by sleeving the identification ring structure 1 over the frozen sample holder structure 2 and marking specific information of samples on the identification ring structure 1, the marking of different samples is realized and the technical problem that samples would easily be confused with each other due to the difficulty to mark the frozen sample holder is effectively avoided, without hindering normal use of the frozen sample holder.

Figure 2:
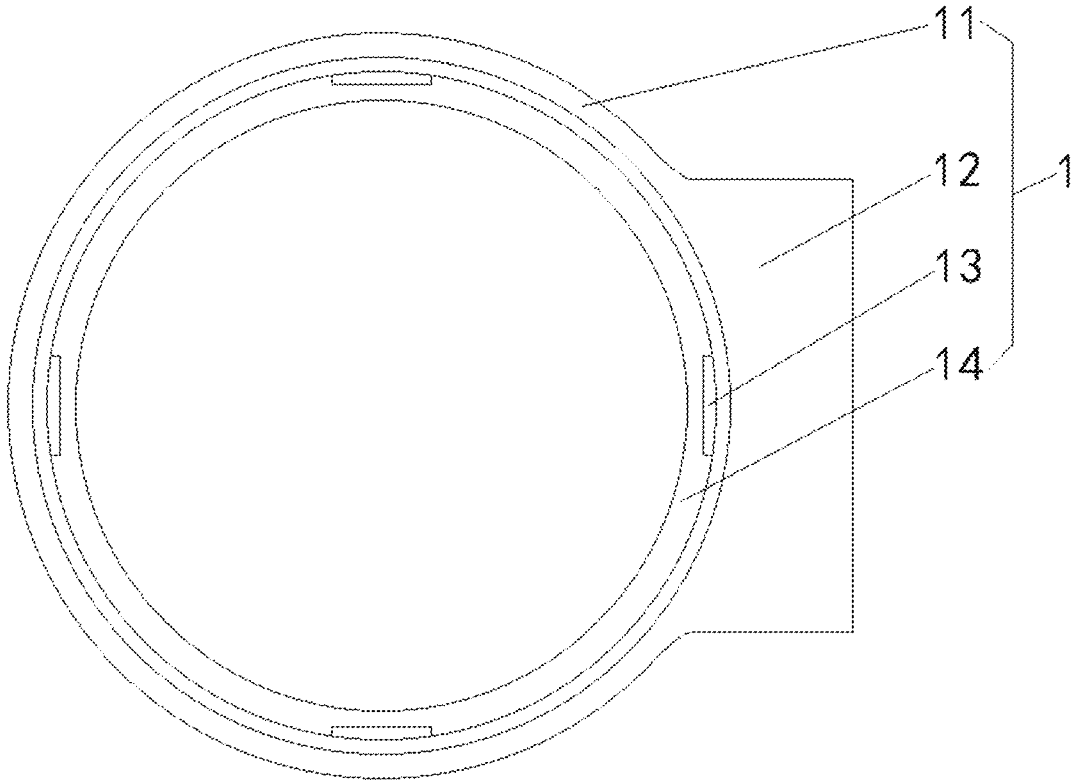
FIG. 2 is a structural schematic diagram showing the identification ring structure of the frozen sample holder having an identification ring shown in FIG. 1 in a bottom view.

In an optional example of the present embodiment, referring to FIG. 2, the identification ring structure 1 includes an identification ring body 11 and an identification plate 12, and the identification ring body 11 and the identification plate 12 are in connection with each other; the identification ring body 11 is provided with an accommodating space, and the frozen sample holder structure 2 is at least partially accommodated in the accommodating space and is in connection with the identification ring body 11; and the identification segment is provided on a face of the identification plate 12 at the same side relative to the face where the frozen sample holder structure 2 is placed.

Specifically, the identification ring body 11 and the identification plate 12 are formed integrally, the identification ring body 11 is in an annular structure, and an area enclosed by an inner ring wall thereof is configured as the accommodating space, which is a cylindrical space, and the frozen sample holder structure 2 is arranged in this accommodating space and is fixed relative to the identification ring body 11; and the identification plate 12 is in connection with an outer side wall of the identification ring body 11, the identification segment provided on the upper surface of the identification plate 12 is configured to mark the QR code and the pathological number of a sample in the frozen sample holder structure 2.

Optionally, referring to FIG. 2, the identification ring structure 1 further includes a fixture block 13, which is in connection with the identification ring body 11 and is located in the accommodating space; the frozen sample holder structure 2 includes a frozen sample holder body 21 and a clamping groove 22; the clamping groove 22 is arranged along the circumferential direction of the frozen sample holder body 21, and the fixture block 13 is snapped in the clamping groove 22 so as to connect the frozen sample holder body 21 with the identification ring body 11.

Specifically, the inner ring wall of the identification ring body 11 is provided with the fixture block 13, and the fixture block 13 is snapped in the clamping groove 22 on an edge of the frozen sample holder body 21 so as to support the frozen sample holder body 21 in a vertical direction; and the outer edge of the frozen sample holder body 21 abuts against the inner edge of the identification ring body 11.

Optionally, the identification ring structure 1 further includes a protrusion 14, the protrusion 14 is arranged along the circumferential direction of the inner ring wall of the identification ring body 11, the protrusion 14 abuts against the top surface of the frozen sample holder body 21, and the protrusion 14 is located above the fixture block 13.

Specifically, the protrusion 14 is arranged along the circumferential direction of the top of the inner ring wall of the identification ring body 11, thereby forming an annular limiting baffle plate, and when the identification ring body 11 is sleeved over the frozen sample holder body 21, the top surface of the frozen sample holder body 21 abuts against the bottom surface of the protrusion 14, thereby effectively avoiding the protruding of the frozen sample holder body 21 from the top of the identification ring body 11; and a surrounding structure is formed at the edge of the top surface of the frozen sample holder body 21 between the protrusion 14 and the identification ring body 11, thereby avoiding damages to an edge of the top surface of the frozen sample holder body 21 due to bumps.

In an optional example of the present embodiment, at least one fixture block 13 is provided, and when a plurality of fixture blocks 13 is provided, the plurality of fixture blocks 13 is evenly distributed along the circumferential direction of the accommodating space.

Specifically, the plurality of fixture blocks 13 is evenly distributed on the inner ring wall of the identification ring body 11, the fixture block 13 is snapped in the clamping groove 22 on the edge of the frozen sample holder body 21, thereby providing supporting for the frozen sample holder body 21 in a vertical direction and maintaining the balance of the frozen sample holder body 21.

In an optional example of the present embodiment, the frozen sample holder body 21 includes a groove body 211 and a boss 212, and the groove body 211 and the boss 212 are arranged coaxially; and a plurality of the groove bodies 211 and a plurality of the bosses 212 are provided, and the plurality of groove bodies 211 and the plurality of bosses 212 are alternately arranged from outside to inside in a surrounding manner.

Specifically, the plurality of groove bodies 211 and the plurality of bosses 212 are alternately arranged on the top surface of the frozen sample holder body 21 from outside to inside in a surrounding manner, the boss 212 is in an annular structure, and respective adjacent bosses 212 are arranged at an equal spacing distance, and the groove body 211 is arranged between adjacent bosses 212, and it can be determined accordingly that the groove body 211 is also annular.

During use, an operator places sample sections on the top surface of the frozen sample holder body 21, and a rough surface is formed because of the plurality of groove bodies 211 and the plurality of bosses 212 on the top surface of the frozen sample holder body 21, which effectively avoids the sample sections from sliding on the top surface of the frozen sample holder body 21.

Optionally, the bottom surface of the groove body 211 is inclined in a direction towards the center from edge of the frozen sample holder body 21. The multiple groove bodies 211 are respectively arranged between adjacent bosses 212, and the bottom surface of the groove body 211 is inclined in a direction towards the center from the edge of the frozen sample holder body 21, which is conducive to the gathering of samples towards the center of the top surface of the frozen sample holder body 21.

Figure 4:
FIG. 4 is a structural schematic diagram showing the frozen sample holder having an identification ring shown in FIG. 1 in a side view.

In an optional example of the present embodiment, referring to FIG. 4, the bottom 24 of the frozen sample holder body 21 protrudes from the lower end of the identification ring body 11. After that the frozen sample holder body 21 is placed on a machine, the bottom surface of the frozen sample holder body 21 is in contact with the machine, thereby avoiding the problem that the frozen sample holder body 21 is inclined after being placed.

In an optional example of the present embodiment, the face of the identification ring body 11 away from the placement face of the frozen sample holder structure 2 has rounded inner and outer edges.

Specifically, the inner and outer side edges of the lower end of the identification ring body 11 are formed at a certain radian, such that the frozen sample holder body 21 is not in contact with the lower end of the identification ring body 11 and a certain gap is retained; and the process of installing the whole device on the machine is more facilitated, without colliding with the machine.

In an optional example of the present embodiment, the upper surface of the identification plate 12 is inclined downwards in a direction towards the side away from the placement face of the frozen sample holder structure 2. After that the frozen sample holder body 21 has been placed, the identification segment on the upper surface of the identification plate 12 can face the operator in an angle facilitating the observation, which facilitates the recognition, the code-scanning, the recording or the like of the operator.

Figure 5:
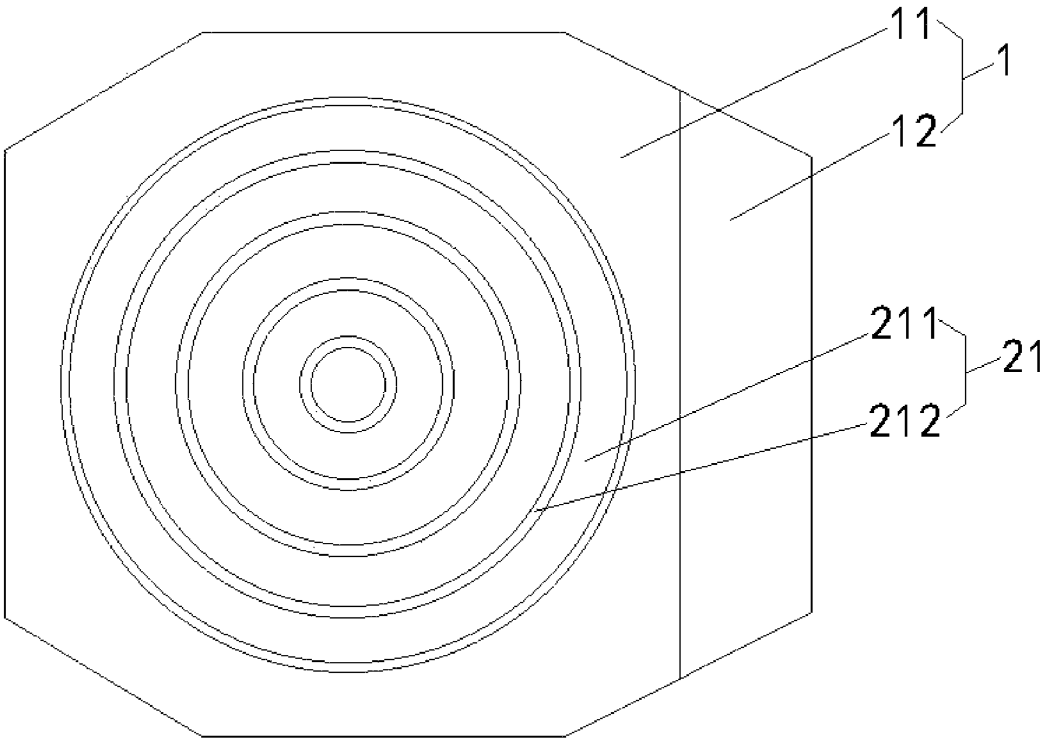
FIG. 5 is a structural schematic diagram showing a frozen sample holder having an identification ring provided in a second embodiment of the present disclosure in a top view.

In some further embodiments of the present disclosure, a frozen sample holder having an identification ring is provided, and referring to FIG. 5, the identification ring body 11 and the identification plate 12 of the frozen sample holder having an identification ring are integrally formed, and the both are of a polygon structure of bilateral symmetry. This structure is conducive to improving the balance and the stability of the identification ring structure 1 and the frozen sample holder structure 2 after that the frozen sample holder structure 2 is placed.

At last, it is to be clarified: the respective embodiments of the present disclosure are described in a progressive manner, and the differences of each embodiment relative to other embodiments are mainly explained, while reference can be made to each other for same or similar parts between respective embodiments. The above respective embodiments of the present disclosure are merely used to explain the technical solutions of the present disclosure, rather than limiting the same. Although the present disclosure is explained in detail referring to the preceding respective embodiments, it should be understood for a person ordinarily skilled in the art that modifications could still be made to the technical solutions recorded in the preceding respective embodiments, or partial or all technical features therein could be substituted with equivalents; and these modifications or substitutions do not make the essence of the corresponding technical solutions depart from the scope of the technical solutions of the respective embodiments of the present disclosure.

INDUSTRIAL APPLICABILITY

The present disclosure provides a frozen sample holder having an identification ring, comprising an identification ring structure and a frozen sample holder structure, wherein the identification ring structure is in connection with an outer wall of the frozen sample holder structure; and the identification ring structure includes an identification segment, which is configured to mark the information of a sample in the frozen sample holder structure. The present disclosure solves the technical problem existing in the operating process of freezing sectioning all along that multiple samples would easily be confused with each other due to the difficulty to mark frozen sample holders.

In addition, it could be understood that the frozen sample holder having an identification ring according to the present disclosure is reproduceable, and can be used in various industrial applications. For example, the frozen sample holder having an identification ring according to the present disclosure can be applied to the technical field of freezing sectioning-related equipment.

What is claimed is:

1. A frozen sample holder having an identification ring, comprising:

an identification ring structure; and a frozen sample holder structure comprising a frozen sample holder body and a clamping groove, the clamping groove being arranged along a circumferential direction of the frozen sample holder body, wherein the identification ring structure is connected with an outer wall of the frozen sample holder structure;

wherein the identification ring structure comprises:

an identification segment that is configured to be marked with information of a sample in the frozen sample holder structure, an identification ring body provided with an accommodating space, an identification plate, and a plurality of fixture blocks that are (i) connected with the identification ring body, (ii) located in the accommodating space, (iii) distributed at an equal interval along a circumferential direction of the accommodating space, and (iv) snapped in the clamping groove so as to connect the frozen sample holder body with the identification ring body;

wherein the identification ring body and the identification plate are connected with each other;

wherein the frozen sample holder structure is at least partially accommodated in the accommodating space and is connected with the identification ring body;

wherein the identification segment is provided on a face of the identification plate at a same side relative to a face where the frozen sample holder structure is placed;

wherein the frozen sample holder body comprises a plurality of groove bodies and a plurality of bosses, the plurality of groove bodies and the plurality of bosses being alternately arranged from outside to inside in a surrounding manner, wherein one groove body in the plurality of groove bodies and one boss in the plurality of bosses are arranged coaxially; and wherein a bottom surface of the groove body is inclined in a direction towards a center from an edge of the frozen sample holder body.

2. The frozen sample holder having an identification ring according to claim 1, wherein the identification ring body and the identification plate are formed integrally, wherein the identification ring body is in an annular structure, and an area enclosed by an inner ring wall of the identification ring body is provided as the accommodating space, wherein the accommodating space is a cylindrical space, and the frozen sample holder structure is arranged in the accommodating space and is fixed relative to the identification ring body, and wherein the identification plate is connected with an outer side wall of the identification ring body, and wherein the identification segment is arranged on an upper surface of the identification plate, so as to be marked with a QR code and a pathological number of a sample in the frozen sample holder structure.

3. The frozen sample holder having an identification ring according to claim 2, wherein the plurality of fixture blocks are arranged on the inner ring wall of the identification ring body, wherein the plurality of fixture blocks are snapped in the clamping groove on an edge of the frozen sample holder body so as to support the frozen sample holder body in a vertical direction, and wherein an outer edge of the frozen sample holder body abuts against an inner edge of the identification ring body.

4. The frozen sample holder having an identification ring according to claim 2, wherein the identification ring structure further comprises a protrusion, wherein the protrusion is arranged along a circumferential direction of the inner ring wall of the identification ring body, wherein the protrusion abuts against a top surface of the frozen sample holder body, and wherein the protrusion is located above the fixture block.

5. The frozen sample holder having an identification ring according to claim 4, wherein the protrusion is arranged along a circumferential direction of a top of the inner ring wall of the identification ring body, thereby forming an annular limiting baffle plate, and when the identification ring body is sleeved over the frozen sample holder body, the top surface of the frozen sample holder body abuts against a bottom surface of the protrusion, and wherein a surrounding structure is formed at an edge of the top surface of the frozen sample holder body between the protrusion and the identification ring body.

6. The frozen sample holder having an identification ring according to claim 1, wherein the boss is in an annular structure, wherein respective adjacent bosses are arranged at an equal spacing distance, wherein the groove body is arranged between adjacent bosses, and wherein the groove body is annular.

7. The frozen sample holder having an identification ring according to claim 1, wherein a bottom of the frozen sample holder body protrudes from a lower end of the identification ring body.

8. The frozen sample holder having an identification ring according to claim 1, wherein a face of the identification ring body away from the face where the frozen sample holder structure is placed has rounded inner and outer edges.

9. The frozen sample holder having an identification ring according to claim 1, wherein an upper surface of the identification plate is inclined downwards in a direction towards a side away from the face where the frozen sample holder structure is placed.

10. The frozen sample holder having an identification ring according to claim 3, wherein the identification ring structure further comprises a protrusion, wherein the protrusion is arranged along a circumferential direction of the inner ring wall of the identification ring body, wherein the protrusion abuts against a top surface of the frozen sample holder body, and wherein the protrusion is located above the fixture block.

* * * * *